Patented Mar. 31, 1936

2,036,122

UNITED STATES PATENT OFFICE 2,036,122

MONOAZO-DYESTUFFS AND THEIR PRODUCTION

Achille Conzetti, Basel, Switzerland, assignor to the firm J. R. Geigy A. G., Basel, Switzerland No Drawing. Application September 25, 1935, Serial No. 42,137. In Germany February 1, 1934

10 Claims. (Cl. 260—92)

The present invention consists in the manufacture of valuable dyestuffs for wool, silk and lacquers on the base of nitro- and acetyl-cellulose by coupling a diazo-compound of an amine of the general formula:

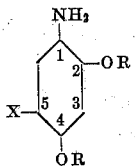

wherein R is a benzene radical and X is hydrogen or halogen, with an arylsulpho-(N)-or benzoyl-(N)-derivative of a 1-amino-8-hydroxynaphthalenedisulphonic acid.

The new dyestuffs dye wool and silk very beautiful, pure red-violet tints which, besides good fastness to fulling and light, have particularly good fastness to sea-water. The fastness to light of the colored lacquers is also very good.

From the known dyestuffs derived from diazotized aryl- or aralkyl-ethers of 1-amino-2-hydroxybenzene, their substitution products or derivatives, for example the sulphonamides, and the aforesaid azo-components, the new dyestuffs differ in their surprising fastness to sea-water, their better adsorption under neutral conditions and their purer, bluer tint, the brightness of which surpasses all attained with azodyestuffs of this color range.

The following example illustrates the invention:—

27.7 kilos of 1-amino-2,4-diphenoxybenzene (a golden-yellow, thick oil which is obtainable by the reaction of 2,4-dichloro-1-nitrobenzene with phenol in the presence of alkali hydroxide at a temperature of 130–150° C., reduction of the nitro-group to the amino-group and distillation in a vacuum at 240–250° C. under 18 mm. pressure) are diazotized. The diazo-solution is run, while stirring well and at 0° C., into an aqueous solution of 47.5 kilos of paratoluene-sulpho-(N)-1-amino-8-hydroxynaphthalene-3,6-disulphonic acid and an excess of sodium acetate. By gradual addition of a sodium carbonate solution the mixture is neutralized. When coupling is complete the mixture is heated and dyestuff salted out, filtered and dried.

It is a bluish-red powder soluble in water to a vivid, bluish-red solution and in concentrated sulphuric acid to a pure blue solution. It dyes wool, silk and nitro- or acetylcellulose lacquers clear red-violet tints of very good fastness to light; the dyed fibres are also very fast to fulling and of excellent fastness to sea-water.

Instead of the 1-amino-2,4-diphenoxybenzene there may be used, for example, the corresponding 1-amino-2,4-di-(2',2''- or 4',4''-dimethyl- or 4',4'' - dichloro) - phenoxybenzene, or the corresponding substitution products derived from halogen substituted ethers, for example from 5-chloro-1-amino-2,4-diphenoxybenzene, whereby quite similar dyestuffs are obtained. Furthermore, in place of the paratoluene-sulpho-(N)-1-amino - 8 - hydroxynaphthelene-3,6-disulphonic acid there may be used the benzenesulpho-(N)-1-amino-8-hydroxynaphthalene-3,6- or 4,6-disulphonic acid. If, instead of the arylsulpho-(N) - 1-amino-8-hydroxynaphthalenedisulphonic acid there is used the benzoyl-(N)-1-amino-8-hydroxynaphthalenedisulphonic acid there is obtained a dyestuff having equally valuable properties of an essentially bluer tint.

What I claim is:—

1. A process for the manufacture of monoazo-dyestuffs, consisting in coupling a diazo-compound of an amine of the general formula:

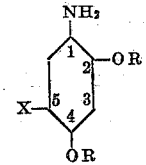

wherein R represents a benzene radical and X represents a member of the group consisting of hydrogen and halogen, with an acidyl-(N)-derivative of a 1-amino-8-hydroxynaphthalenedisulphonic acid.

2. A process for the manufacture of monoazo-dyestuffs, consisting in coupling a diazo-compound of an amine of the general formula:

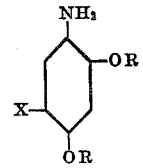

wherein R represents a benzene radical and X represents a member of the group consisting of hydrogen and halogen, with an arylsulpho-(N)-derivative of a 1-amino-8-hydroxynaphthalenedisulphonic acid.

3. A process for the manufacture of monoazo-dyestuffs, consisting in coupling a diazo-compound of an amine of the general formula:

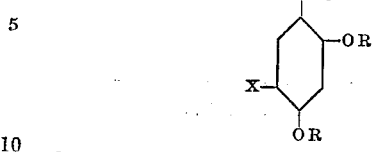

wherein R represents a benzene radical and X represents a member of the group consisting of hydrogen and halogen with a benzoyl-(N)-derivative of a 1-amino-8-oxynaphthalenedisulphonic acid.

4. A process for the manufacture of monoazo-dyestuffs, consisting in coupling diazotized 1-amino-2,4-diphenoxybenzene with paratoluene-sulpho-(N)-1-amino-8-hydroxynaphthalene-3,6-disulphonic acid.

5. A process for the manufacture of monoazo-dyestuffs, consisting in coupling diazotized 1-amino-2,4-di-(2',2''-dimethyl)-phenoxybenzene with paratoluene-sulpho-(N)-1-amino-8-hydroxynaphthalene-3,6-disulphonic acid.

6. A process for the manufacture of monoazo-dyestuffs, consisting in coupling diazotized 5-chloro-1-amino-2,4-diphenoxybenzene with benzoyl-(N)-1-amino-8-hydroxynaphthalene-3,6-disulphonic acid.

7. The monoazo-dyestuffs corresponding to the following formula:

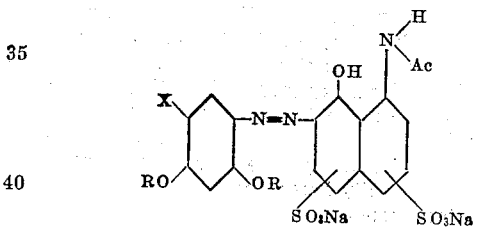

wherein R represents an aromatic residue of the benzene series, X represents a member of the group consisting of hydrogen and halogen and Ac represents a member of the group consisting of aryl-sulpho- and benzoyl, said dyestuffs dyeing wool and silk beautiful red-violet tints of very good fastness to light and fulling and of excellent fastness to sea-water, the colored lacquers being also very fast to light.

8. The reaction product from diazotized 1-amino-2,4-diphenoxybenzene and paratoluene-sulpho-(N)-1-amino-8-hydroxynaphthalene-3,6-disulphonic acid, having the following formula:

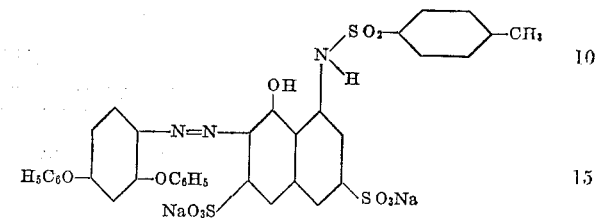

9. The reaction product from diazotized 1-amino-2,4-di-2',2''-dimethyl)-phenoxybenzene and paratoluene-sulpho-(N)-1-amino-8-hydroxynaphthalene-3,6-disulphonic acid, having the following formula:

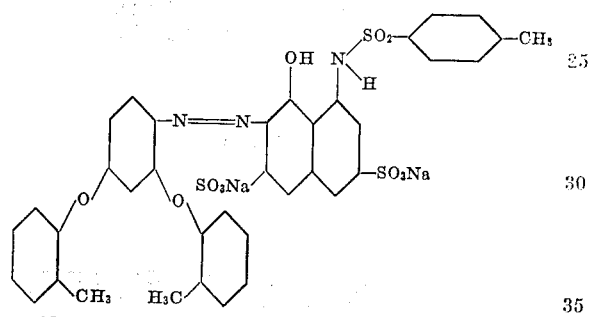

10. The reaction product from diazotized 5-chloro-1-amino-2,4-diphenoxybenzene and benzoyl-(N)-1-amino-8-hydroxynaphthalene-3,6-disulphonic acid, having the following formula:

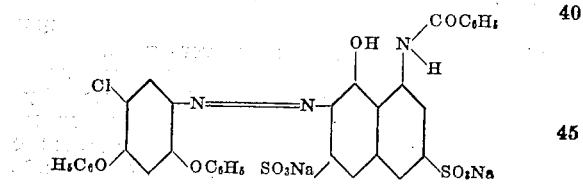

ACHILLE CONZETTI.